US 11,095,453 B2
Mizoguchi et al. (45) Date of Patent: Aug. 17, 2021

(54) COMMUNICATION NETWORK SYSTEM AND COUNT-VALUE SHARING METHOD USING COUNT-VALUE NOTIFICATION NODE WITH TRANSMISSION NODE AND RECEPTION NODE

(71) Applicant: KDDI CORPORATION, Tokyo (JP)

(72) Inventors: Seiichiro Mizoguchi, Tokyo (JP); Hideaki Kawabata, Tokyo (JP); Keisuke Takemori, Tokyo (JP); Ayumu Kubota, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 145 days.

(21) Appl. No.: 16/082,404

(22) PCT Filed: Mar. 14, 2017

(86) PCT No.: PCT/JP2017/010161
§ 371 (c)(1),
(2) Date: Sep. 5, 2018

(87) PCT Pub. No.: WO2017/159671
PCT Pub. Date: Sep. 21, 2017

(65) Prior Publication Data
US 2019/0109716 A1 Apr. 11, 2019

(30) Foreign Application Priority Data
Mar. 14, 2016 (JP) .............. JP2016-050125

(51) Int. Cl.
*H04L 9/32* (2006.01)
*H04L 9/06* (2006.01)
(Continued)

(52) U.S. Cl.
CPC .......... *H04L 9/3242* (2013.01); *B60R 16/023* (2013.01); *H04L 9/0838* (2013.01);
(Continued)

(58) Field of Classification Search
CPC ....... H04L 9/3242; H04L 9/32; H04L 9/0838; H04L 9/0861; H04L 9/0869; H04L 9/08;
(Continued)

(56) References Cited

U.S. PATENT DOCUMENTS 8,627,092 B2 * 1/2014 Fischer ................ H04W 12/06
713/181
9,252,945 B2 * 2/2016 Lewis .................. H04L 9/0825
(Continued)

FOREIGN PATENT DOCUMENTS

CN 104468503 A 3/2015
CN 105095772 A 11/2015
(Continued)

OTHER PUBLICATIONS

A Practical Wireless Attack on the Connected Car and Security Protocol for In-Vehicle Can By Samuel Woo, Hyo Jin Jo, and Dong Hoon Lee, Fellow, IEEE Transactions On Intelligent Transportation Systems, vol. 16, No. 2; pp. 14; Apr. (Year: 2015).*
(Continued)

*Primary Examiner* — Samson B Lemma
*Assistant Examiner* — Ali H. Cheema
(74) *Attorney, Agent, or Firm* — Greenblum & Bernstein, P.L.C.

(57) ABSTRACT

A communication network system, in which a transmission node for transmitting a message is connected to a reception node for receiving the message, is configured to periodically transmit a count-value notification message to notify a count value, which is used to generate and check a message authentication code for the message, to the transmission node and the reception node.

7 Claims, 7 Drawing Sheets

(51) Int. Cl.
*H04L 9/08* (2006.01)
*H04L 29/06* (2006.01)
*H04W 12/02* (2009.01)
*B60R 16/023* (2006.01)
*H04L 12/40* (2006.01)
*H04L 29/08* (2006.01)
*H04L 9/12* (2006.01)

(52) U.S. Cl.
CPC .......... *H04L 9/0861* (2013.01); *H04L 9/0869* (2013.01); *H04L 9/12* (2013.01); *H04L 9/3228* (2013.01); *H04L 12/40* (2013.01); *H04L 63/123* (2013.01); *H04L 67/12* (2013.01); *H04L 63/0428* (2013.01); *H04L 2012/40215* (2013.01); *H04L 2012/40273* (2013.01); *H04L 2209/84* (2013.01)

(58) Field of Classification Search
CPC ....... H04L 9/12; H04L 9/3228; H04L 9/3226; H04L 63/0428; H04L 63/04; H04L 63/123; H04L 63/1416; H04L 12/40; H04L 69/22; H04L 2012/40215; H04L 2012/40273; H04L 2209/84; H04L 9/0894; H04L 63/1466; H04L 63/045; H04L 9/0637; H04W 12/06; H04W 12/02; B60R 16/023; G06F 12/145
USPC ..... 713/171, 181, 168, 189; 726/3; 380/259, 380/239, 270, 193, 46
See application file for complete search history.

(56) References Cited

U.S. PATENT DOCUMENTS

| | | | |
|---|---|---|---|
| 2002/0044658 A1* | 4/2002 | Wasilewski ........... | H04L 63/045 380/239 |
| 2005/0041573 A1 | 2/2005 | Eom et al. | |
| 2006/0198523 A1* | 9/2006 | Shearer .................. | G08C 17/02 380/270 |
| 2008/0098218 A1 | 4/2008 | Sibigtroth et al. | |
| 2011/0238989 A1* | 9/2011 | Machani ............... | H04L 9/3242 713/168 |
| 2012/0257753 A1* | 10/2012 | Ochikubo ............. | H04W 12/02 380/270 |
| 2014/0247786 A1* | 9/2014 | Izu ........................ | H04L 9/3242 370/329 |
| 2014/0270163 A1* | 9/2014 | Merchan ............... | H04L 9/0637 380/46 |
| 2014/0301550 A1* | 10/2014 | Lewis ................... | H04L 9/3226 380/259 |
| 2014/0310530 A1* | 10/2014 | Oguma ................. | H04L 9/3242 713/181 |
| 2015/0074427 A1* | 3/2015 | Lewis ................... | H04L 9/0894 713/193 |
| 2015/0082380 A1 | 3/2015 | Nairn et al. | |
| 2015/0370727 A1* | 12/2015 | Hashimoto ........... | G06F 12/145 711/163 |
| 2016/0171249 A1* | 6/2016 | Circello ................ | H04L 9/0637 713/189 |
| 2016/0191408 A1* | 6/2016 | Yajima ................. | H04L 12/4641 709/225 |
| 2016/0255065 A1* | 9/2016 | Oshida .................... | H04L 69/22 726/3 |
| 2016/0264071 A1* | 9/2016 | Ujiie ..................... | H04L 63/123 |
| 2016/0297401 A1* | 10/2016 | Haga ..................... | B60R 25/307 |
| 2016/0315766 A1* | 10/2016 | Ujiie ..................... | H04L 9/083 |
| 2017/0072875 A1* | 3/2017 | Kim ....................... | H04H 20/12 |
| 2017/0078884 A1* | 3/2017 | Tanabe ................. | H04L 63/1466 |
| 2017/0109521 A1* | 4/2017 | Ujiie .................... | B60R 16/0231 |
| 2017/0195878 A1 | 7/2017 | Takemori et al. | |
| 2018/0219873 A1* | 8/2018 | Sugashima ............... | H04L 9/12 |
| 2018/0227284 A1* | 8/2018 | Sugano ................. | H04L 9/0891 |

FOREIGN PATENT DOCUMENTS

| | | |
|---|---|---|
| JP | H11-265309 A | 9/1999 |
| JP | 2007-060400 A | 3/2007 |
| JP | 2015-177697 A | 10/2015 |
| JP | 2016-012917 A | 1/2016 |
| WO | 2013/065689 A1 | 5/2013 |
| WO | 2013/128317 A1 | 9/2013 |
| WO | 2015/186825 A1 | 12/2015 |

OTHER PUBLICATIONS

CaCAN—Centralized Authentication System in CAN By Ryo Kurachi, Yutaka Matsubara and Hiroaki Takada pp. 10; Nov. (Year: 2014).*
Hiroshi Ueda et al., "Security Authentication System for In-Vehicle Network", SEI Technical Review, No. 187, Jul. 31, 2015, pp. 1-5.
Seiichi Yamamoto et al., "Basic Experiment of Traffic Analysis with Consideration of Flow", Technical Report of IEICE, Japan, Institute of Electronics, Information and Communication Engineers, vol. 104, No. 35, with partial English language translation, May 6, 2014, pp. 35-39.
U.S. Appl. No. 16/068,804 to Keisuke Takemori et al., which was filed on Jul. 9, 2018.
International Search Report issued in International Bureau of WIPO Patent Application No. PCT/JP2017/010161, dated Apr. 11, 2017, along with an English translation thereof.
Office Action issued in Japanese family member Patent Appl. No. 2016-050125, dated Jun. 30, 2017, along with an English translation thereof.
Seiichi Yamamoto et al., "Basic Experiment of Traffic Analysis with Consideration of Flow", Technical Report of IEICE, Japan, Institute of Electronics, Information and Communication Engineers, vol. 104, No. 35, with partial English language translation, May 6, 2004, pp. 35-39.
Office Action issued in Japanese family member Patent Appl. No. 2016-050125, dated Jul. 30, 2017, along with an English translation thereof.
Search Report issued in European Patent Office (EPO) Patent Application No. 17766670.8, dated Oct. 4, 2019.
Notice of Allowance issued in Japanese family member Patent Appl. No. 2017-184092, dated Sep. 24, 2019, along with an English translation thereof.
China Second Office Action (including English Language Translation), dated Apr. 12, 2021 by the China National Intellectual Property Administration, for China Application No. 201780016860.6.

* cited by examiner

COMMUNICATION NETWORK SYSTEM AND COUNT-VALUE SHARING METHOD USING COUNT-VALUE NOTIFICATION NODE WITH TRANSMISSION NODE AND RECEPTION NODE

TECHNICAL FIELD

The present invention relates to a communication network system, a vehicle, a count-value notification node, a count-value sharing method, and a computer program.

The present application claims the benefit of priority on Japanese Patent Application No. 2016-050125 filed on Mar. 14, 2016, the subject matter of which is hereby incorporated herein by reference.

BACKGROUND ART

Recently, vehicles equipped with ECUs (Electronic Control Units) have been provided to realize engine control functions using ECUs. In addition, a CAN (Controller Area Network), which is known as one type of communication networks installed in automobiles, has been used for communication among various types of ECUs in an automobile. As technologies for enabling message authentication using CANS, for example, a message checking technology disclosed by Patent Literature Document 1 has been known. According to the message checking technology disclosed by Patent Literature Document 1, a transmission node includes a transmission counter configured to hold a transmission count value used for generating a message authentication code (MAC) while a reception node includes a reception counter configured to hold a reception count value used for checking the MAC. The reception counter of a reception node is able to hold multiple reception count values in connection with multiple transmission nodes. The reception node uses a reception count value corresponding to each transmission node to check a MAC of a message received from each transmission node.

CITATION LIST

Patent Literature Document

Patent Literature Document 1: Japanese Patent Application Publication No. 2016-12917

SUMMARY OF INVENTION

Technical Problem

According to the message checking method conventionally known, it is possible to check a MAC of a message received from a single transmission node when a reception count value corresponding to the transmission node among multiple reception nodes matches a transmission count value of the transmission node; however, the process of matching count values may cause a high load in processing. As the process of matching the transmission count value and the reception count value, for example, when multiple reception nodes carry out a process of inquiring a transmission count value of a transmission node, it is necessary to exchange an inquiry about count values between multiple reception nodes and the transmission node multiple times. This may increase a burden of load imparted to a CAN, thus causing a possibility that the CAN will be reduced in communication speed.

The present invention is made in consideration of the aforementioned circumstances, and therefore, the present invention aims to provide a communication network system, a vehicle, a count-value notification node, a count-value sharing method, and a computer program, thus improving efficiency in the communication network system in which a transmission node configured to transmit a message is connected to a reception node configured to receive the message.

Solution to Problem (1) According to one aspect of the invention, a communication network system, in which a transmission node configured to transmit a message is connected to a reception node configured to receive the message, further includes a count-value notification node configured to periodically transmit a count-value notification message used to notify a count value, which is used to generate and check a message authentication code for the message, to each of the transmission node and the reception node.

(2) According to one aspect of the invention, in the communication network system of according to (1), the transmission node further includes a session key storage configured to store a session key shared by the reception node, a counter configured to hold the count value, which is increased by a predetermined count value upon transmitting the message, a message authentication code generator configured to generate the message authentication code based on transmission data stored on the message, the count value held by the counter, and the session key stored on the session key storage, a transmitter configured to transmit the message having stored the transmission data, a predetermined number of lower bits in a bit string of the count value held by the counter, and the message authentication code generated by the message authentication code generator, and a counter setting process configured to set the count value obtained from the count-value notification message to a new count value held by the counter. The reception node further includes a counter configured to hold the count value obtained from the count-value notification message, a session key storage configured to store a session key shared by the transmission node, and a message authentication code checking process configured to generate a message authentication code based on the transmission data stored on the message received from the transmission node, a remaining number of upper bits other than the predetermined number of lower bits in the bit string of the count value held by the counter of the reception node, the predetermined number of lower bits stored on the message received from the transmission node, and the session key stored on the session key storage of the reception node, thus checking whether the message authentication code matches the message authentication code stored on the message received from the transmission node.

(3) According to one aspect of the invention, in the communication network system according to any one of (1) and (2), the count-value notification node further includes a session key storage configured to store a session key shared by the transmission node and the reception node, an encryption process configured to encrypt the count value, which is notified to the transmission node and the reception node, using the session key stored on the session key storage of the count-value notification node, and a transmitter configured to periodically transmit the count-value notification message having stored an encrypted count value representing a result of encrypting the count value according to the encryption process, and wherein each of the transmission node and the reception node further includes a decryption process configured to decrypt the encrypted count value, which is stored on the count-value notification message, using the session key stored on the session key storage thereof.

(4) According to one aspect of the invention, in the communication network system according to (3), the count-value notification node further includes a session key storage configured to store a session key shared by the transmission node and the reception node, and a message authentication code generator configured to generate a message authentication code based on the count value, which is notified to the transmission node and the reception node, and the session key stored on the session key storage of the count-value notification node. The transmitter of the count-value notification node periodically transmits the count-value notification message having stored the encrypted count value and the message authentication code generated by the message authentication code generator of the count-value notification node. Each of the transmission node and the reception node further includes a message authentication code checking process configured to generate a message authentication code based on a decrypted count value representing a result of decryption of the decryption process and the session key stored on the session key storage thereof, thus checking whether the message authentication code matches the message authentication code stored on the count-value notification message.

(5) According to one aspect of the invention, a vehicle is equipped with the communication network system according to any one of (1) to (4).

(6) According to one aspect of the invention, a count-value notification node adapted to a communication network system, in which a transmission node configured to transmit a message is connected to a reception node configured to receive the message, further includes a transmitter configured to periodically transmit a count-value notification message used to notify a count value, which is used to generate and check a message authentication code of the message, to each of the transmission node and the reception node.

(7) According to one aspect of the invention, a count-value sharing method adapted to a communication network system, in which a transmission node configured to transmit message is connected to a reception node configured to receive the message, further includes a transmission step configured to periodically transmit a count-value notification message used to notify a count value, which is used to generate and check a message authentication code of the message, to each of the transmission node and the reception node.

(8) According to one aspect of the invention, a computer program causes a computer of a count-value notification node adapted to a communication network, in which a transmission node configured to transmit a message is connected to a reception node configured to receive the message, to implement a transmission function configured to periodically transmit a count-value notification message used to notify a count value, which is used to generate and check a message authentication code of the message, to each of the transmission node and the reception node.

Advantageous Effects of Invention

According to the present invention, it is possible to obtain an effect of improving efficiency in a communication network system in which a transmission node configured to transmission a message is connected to a reception node configured to receive the message.

DESCRIPTION OF EMBODIMENT

Hereinafter, an embodiment of the present invention will be described with reference to the drawings. In this connection, the embodiment refers to an automobile as an example of a vehicle. In addition, the following description refers to a communication network system installed in an automobile as one embodiment of communication network system.

Figure 1:
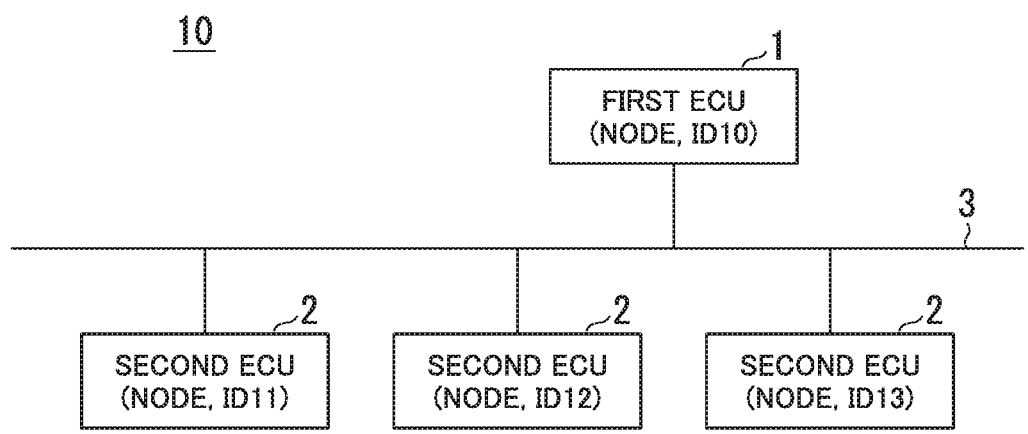
FIG. 1 is a diagram showing a configuration example of a communication network system 10 according to one embodiment.

FIG. 1 is a diagram showing a configuration example of the communication network system 10 according to the present embodiment. The communication network system 10 is installed in an automobile. In FIG. 1, the communication network system 10 includes multiple ECUs (electronic control units) 1, 2 and a CAN 3. The ECUs 1, 2 are connected to the CAN 3. The ECUs 1, 2 are each configured of a CPU (Central Processing Unit), memory, and the like. Each of the ECUs 1, 2 is one type of computer. That is, it is possible for the ECUs 1, 2 to achieve their functions such that their CPUs execute computer programs for achieving the functions of the ECUs 1, 2. For example, the ECUs 1, 2 may have a control function for controlling devices installed in an automobile. For example, the ECUs 1, 2 may server as a drive ECU, a vehicle-body ECU, and a safety control ECU.

For the sake of explanation, the communication network system 10 of the present embodiment includes four ECUs 1, 2 connected to the CAN 3. The CAN 3 is configured to transfer messages to be exchanged between the ECUs 1, 2. That is, the ECUs 1, 2 are able to transmit or receive messages through the CAN 3. The CAN 3 is designed to transfer messages using a predetermined frame format. The ECUs 1, 2 serve as nodes (or communication devices) connectible to the CAN 3. In the present embodiment, each of the ECUs 1, 2 may achieve either the function of a transmission node configured to transmit messages or the function of a reception node configured to receive messages.

As shown in FIG. 1, the four ECUs 1, 2 are assigned their identifiers of CAN (ID), e.g. ID10, ID11, ID12, and ID13. Herein, the ECU 1 assigned ID10 will be referred to as a first ECU 1. The ECUs 2 assigned ID11, ID12, and ID13 will be each referred to as a second ECU 2.

Figure 2:
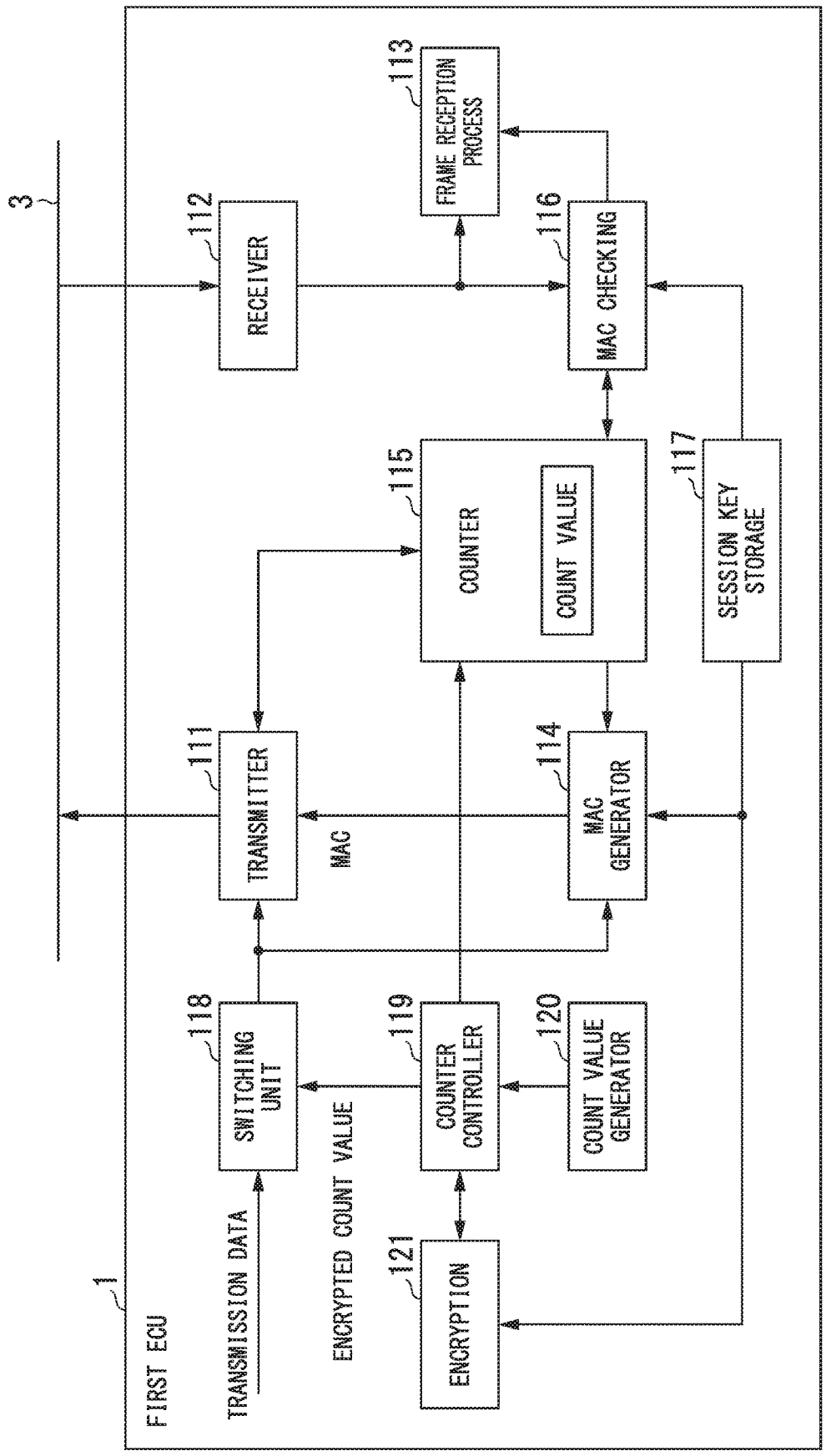
FIG. 2 is a block diagram showing a configuration example of a first ECU according to one embodiment.

FIG. 2 is a block diagram showing a configuration example of the first ECU 1 according to the present embodiment. In FIG. 2, the first ECU 1 includes a transmitter 111, a receiver 112, a fame reception process 113, a MAC (Message Authentication Code) generator 114, a counter 115, a MAC checking process 116, a session key storage 117, a switching unit 118, a counter controller 119, a count-value generator 120, and an encryption process 121.

The transmitter 111 transmits to the CAN 3 a message having a predetermined frame format for the CAN 3.

The receiver 112 receives a message having the predetermined frame format through the CAN 3. A data frame is known as one type of frames having the predetermined frame format for the CAN 3. The transmitter 111 transmits data frames to the CAN 3. The receiver 112 receives data frames through the CAN 3.

The transmitter 111 inputs data, which are stored in a data field (Data Field) of a data frame, via the switching unit 118. The transmitter 111 inputs transmission data or an encrypted count value via the switching unit 118. The encrypted count value is data produced by encrypting a count value. The transmitter 111 stores the input data from the switching unit 118 on a data field of a data frame. The upper limit of a data length storable on a data field of a data frame is 64 bits. The frame reception process 113 carries out a reception process for a data frame received by the receiver 112 through the CAN 3.

The MAC generator 114 generates a MAC using data stored on a data field of a data frame. The MAC generator 114 generates and sends the MAC to the transmitter 111. The transmitter 111 receives the MAC from the MAC generator 114 and then stores the MAC on a predetermined portion of a data frame.

The counter 115 servers as a transmission counter. As the function of a transmission counter, the counter 115 holds a count value which is increased by a predetermined count value upon transmitting each data frame. For example, the present embodiment sets one to the predetermined count value. Therefore, the counter 115 holds a count value which is increased by one every time the transmitter 111 transmits one data frame to the CAN 3. The count value is increased by one every time the first ECU 1 transmits one data frame to the CAN 3. For example, the present embodiment allocates 32 bits to the data length of a count value held by the counter 115.

The MAC checking process 116 checks a MAC stored on a data frame received through the CAN 3. The session key storage 117 stores a session key. The session key is shared by the first ECU 1 and the second ECU 2 in advance. The switching unit 118 inputs transmission data. In addition, the switching unit 118 inputs an encrypted count value from the counter controller 119. The switching unit 118 switches between the transmission data and the encrypted count value as its output data to the transmitter 111.

The count-value generator 120 generates a count value. For example, the count-value generator 120 generates a random number and then generates a count value based on the random number. In this connection, it is possible to sets zeros to lower bits of a bit string of a count value generated by the count-value generator 120. The counter controller 119 controls the count value. The encryption process 121 encrypts the count value using the session key stored on the session key storage 117.

The counter controller 119 sends the count value generated by the count-value generator 120 to the encryption process 121. The encryption process 121 receives the count value from the counter controller 119 and then encrypts the count value using the session key. The encryption process 121 sends the encrypted count value, which is a count value subjected to encryption, to the counter controller 119. The counter controller 119 receives the encrypted count value from the encryption process 121 and then sends the encrypted count value to the switching unit 118. Upon receiving the encrypted count value from the counter controller 119, the switching unit 118 sends the encrypted count value to the transmitter 111. For example, the present embodiment allocates 32 bits to the encrypted count value.

In addition, the counter controller 119 sends an original count value before encryption, corresponding to the encrypted count value, to the counter 115. The counter 115 replaces the count value received from the counter controller 119 with the previously-held count value, thus holding the previously-held count value. That is, the count value generated by the count-value generator 120 is held by the counter 115 as a new count value. The new count value held by the counter 115 is transferred as the encrypted count value from the counter controller 119 to the transmitter 111 via the switching unit 118, and then, the new count value is stored on a predetermined portion of a data frame.

Figure 3:
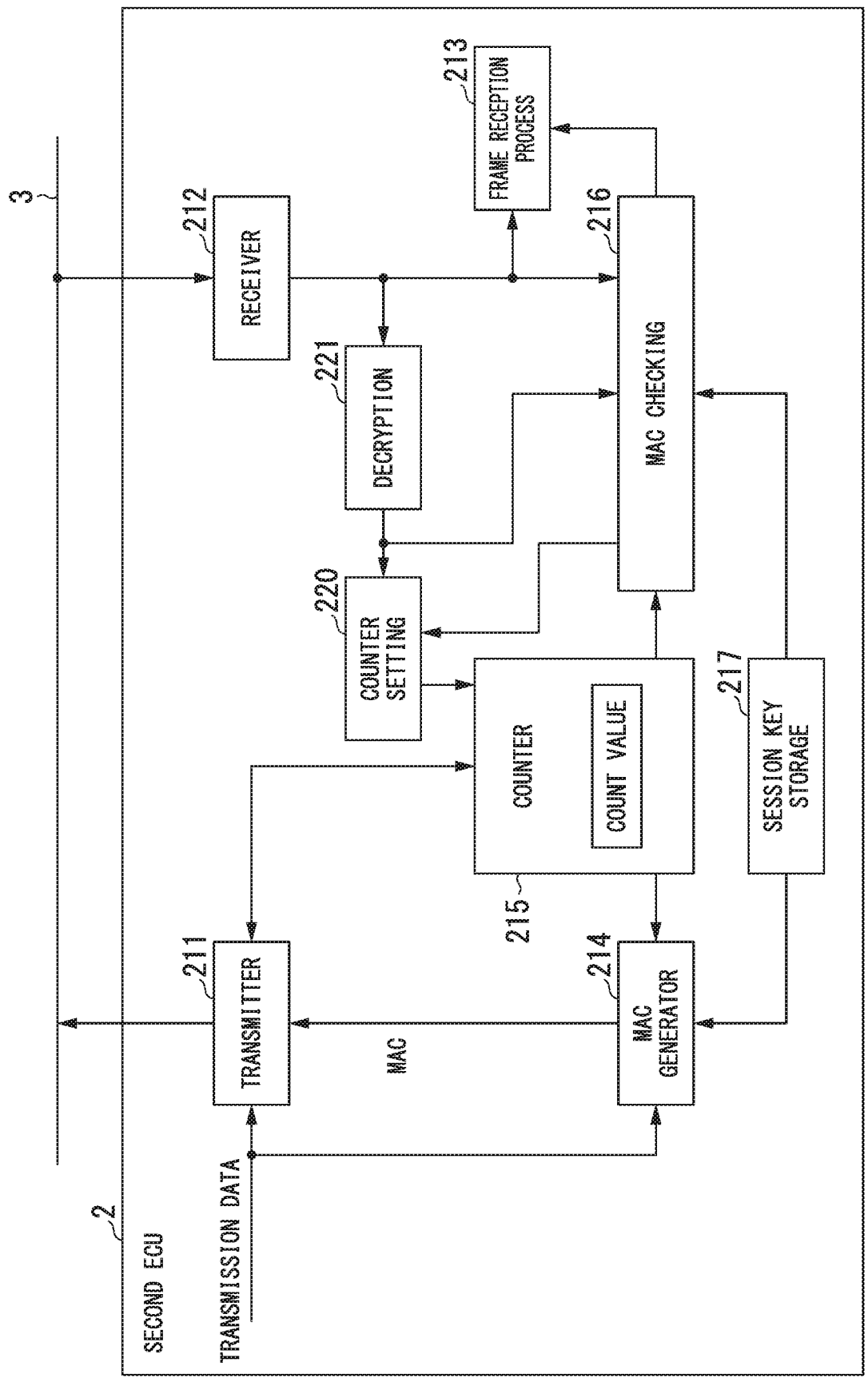
FIG. 3 is a block diagram showing a configuration example of a second ECU according to one embodiment.

FIG. 3 is a block diagram showing a configuration example of the second ECU 2 according to the present embodiment. In FIG. 3, the second ECU 2 includes a transmitter 211, a receiver 212, a frame reception process 213, a MAC generator 214, a counter 215, a MAC checking process 216, a session key storage 217, a counter setting process 220, and a decryption process 221.

The transmitter 211 transmits to the CAN 3 messages having a predetermined frame format for the CAN 3.

The receiver 212 receives messages having the predetermined frame format through the CAN 3. The transmitter 1 transmits data frames to the CAN 3. The receiver 212 receives data frames through the CAN 3.

The transmitter 211 inputs transmission data to be stored on a data field of a data frame. The transmitter 211 stores the transmission data input thereto on the data field of a data frame. The frame reception process 213 carries out a reception process for data frames received by the receiver 212 through the CAN 3.

The MAC generator 214 generates a MAC using transmission data stored on the data field of a data frame. The MAC generator 214 generates and sends the MAC to the transmitter 211. The transmitter 211 receives the MAC from the MAC generator 214 and then stores the MAC on the predetermined portion of a data frame.

The counter 215 carries out the function of a transmission counter. According to the function of a transmission counter, the counter 215 holds a count value which is increased by a predetermined count value every time the transmitter 211 transmits each data frame. The predetermined count value is identical to that of the counter 115 of the first ECU 1. The present embodiment assigns one as the predetermined count value. Accordingly, the counter 215 holds a count value which is increased by one every time the transmitter 211 transmits a single data frame to the CAN 3. The count value is increased by one every time the second ECU 2 transmits a single data frame to the CAN 3. The data length of a count value held by the counter 215 of the second ECU 2 is identical to the data length of a count value held by the counter 115 of the first ECU 1. The present embodiment assigns 32 bits as the data length of a count value held by the counter 215.

The MAC checking process 216 checks a MAC stored on a data frame received by the receiver 212 through the CAN 3. The session key storage 217 stores a session key. The session key is shared by the first ECU 1 and the second ECU 2 in advance.

The counter setting process 220 sets a count value to the counter 215. The decryption process 221 decrypts the encrypted count value stored on a data field of a data frame received by the receiver 212 through the CAN 3. The decryption process 221 sends the decrypted data, representing the result of decrypting the encrypted count value, to the counter setting process 220. The decrypted data, representing the result of decrypting the encrypted count value, is used for the counter setting process 220 to set a count value to the counter 215.

Both the MAC checking method and the MAC checking method are applied to the first ECU 1 and the second ECU 2 in common. In this connection, the MAC should be either CMAC (Cipher-based Message Authentication Code) or HMAC (Hash-based Message Authentication Code).

Figure 4:
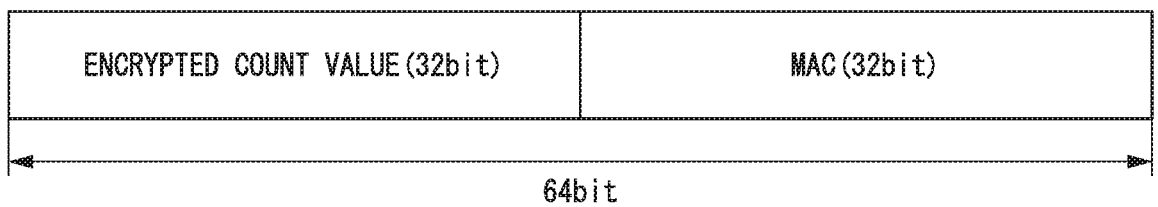
FIG. 4 is a chart showing a configuration example of a data field of a data frame according to one embodiment.
Figure 5:
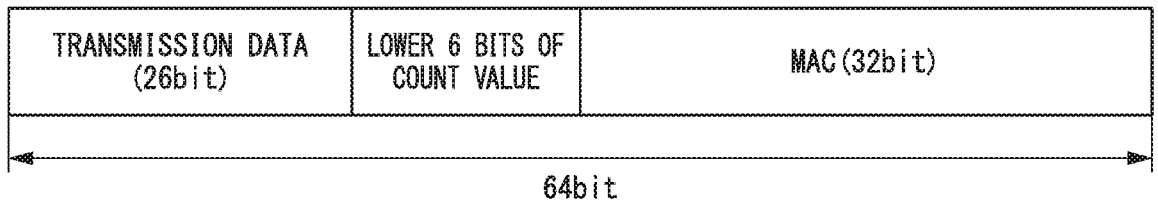
FIG. 5 is a chart showing a configuration example of a data field of a data frame according to one embodiment.

FIGS. 4 and 5 are charts showing configuration examples of data fields of data frames according to the present embodiment.

[Configuration Example of Data Field of Data Frame Used for Notification of Count Value]

FIG. 4 shows a configuration example of a data field of a data frame used for notification of a count value. The data frame used for notification of a count value will be referred to as a count-value notification frame. The count-value notification frame will be explained with reference to FIG. 4.

The count-value notification frame is transmitted from the first ECU 1 to the second ECU 2. The first ECU 1 transmits the count-value notification frame to the second ECUs 2 assigned ID11, ID12, and ID13 through the CAN 3. The first ECU 1 may transmit the count-value notification frame via broadcasting. The count-value notification frame being transmitted via broadcasting is received by the second ECUs 2 assigned ID11, ID12, and ID13 through the CAN 3.

Herein, a 32-bit encrypted count value and a 32-bit MAC are stored on the data field of the count-value notification frame. The transmitter 111 of the first ECU 1 stores the encrypted count value received from the switching unit 118 and the MAC received from the MAC generator 114 on the data field of the count-value notification frame. In this connection, the MAC stored on the data field may be a predetermined portion of a bit string of a MAC generated by the MAC generator 114. For example, it is possible to store a predetermined portion of a bit string of a 256-bit MAC generated by the MAC generator 114, e.g. a 32-bit portion of the bit string, on the data field.

(Method of Generating Count-Value Notification Frame in First ECU 1)

The method of generating a count-value notification frame in the first ECU 1 will be described below. The counter controller 119 delivers an encrypted count value, corresponding to a count value generated by the count-value generator 120, to the transmitter 111 via the switching unit 118. The counter controller 119 sends an original count value before encryption, corresponding to the encrypted count value, to the counter 115. The counter 115 receives the count value from the counter controller 119 and then holds the count value instead of the previously-held count value. The MAC generator 114 generates a MAC for the count value newly held by the counter 115 by using the session key stored on the session key storage 117. The MAC generator 114 generates and sends the MAC to the transmitter 111.

As shown in FIG. 4, the transmitter 111 stores the encrypted count value, which is received from the counter controller 119 via the switching unit 118, and the MAC received from the MAC generator 114 on the data field of the count-value notification frame. Both the encrypted count value and the MAC stored on the data field of a single count-value notification frame are generated using the same count value. The predetermined frame format for data frames transferred through CANS can be applied to another portion of the data field of the count-value notification frame. The transmitter 111 transmits count-value notification frames to the CAN 3.

In this connection, it is possible to set zeros to lower bits of a bit string of a count value generated by the count-value generator 120. Specifically, it is possible to set zeros to lower bits (e.g. six bits in lower position in FIG. 5) of a counter value stored on the data field of a data frame shown in FIG. 5 within a bit string of a count value generated by the count-value generator 120.

(Reception Process Method of Count-Value Notification Frame in Second ECU 2)

The reception process method of a count-value notification frame in the second ECU 2 will be described below. The receiver 212 receives a count-value notification frame through the CAN 3. The decryption process 221 decrypts the encrypted count value stored on the data field of the count-value notification frame received by the receiver 212. Data representing the result of decrypting the encrypted count value will be referred to as a decrypted count value. The decryption process 221 sends the decrypted count value to the MAC checking process 216 and the counter setting process 220.

The MAC checking process 216 checks a MAC stored on the data field of the count-value notification frame received by the receiver 212. The method of checking the MAC of the count-value notification process will be described below. The MAC checking process 216 receives the decrypted count value from the decryption process 221.

The MAC checking process 216 generates a MAC for the decrypted count value using the session key stored on the session key storage 217. The MAC for the decrypted count value will be referred to as a decrypted-count-value MAC. The MAC checking process 216 compares the decrypted-count-value MAC with the MAC stored on the data field of the count-value notification frame received by the receiver 212. According to the result of comparison, it is possible to successfully complete MAC checking when those MACs match each other, but MAC checking will fail when those MACs do not match each other.

When the MAC stored on the data field is merely a predetermined portion of a bit string of a MAC generated by the MAC generator 114, the MAC checking process 216 uses the predetermined portion of the bit string of the decrypted-count-value MAC subjected to MAC checking. When the MAC stored on the data field is a 32-bit portion of a bit string of a 256-bit MAC generated by the MAC generator 114, for example, the MAC checking process 216 uses a 32-bit portion of the bit string of the decrypted-count-value MAC subjected to MAC checking.

Upon successfully completing MAC checking, the MAC checking process 216 notifies the counter setting process 220 of a success of MAC checking. Upon notified of a success of MAC checking via the MAC checking process 216, the counter setting process 220 receives the decrypted count value from the decryption process 221 and sends the decrypted count value to the counter 215. The counter 215 receives the decrypted count value from the counter setting process 220 and holds the decrypted count value instead of the previously-held count value.

Upon failed in MAC checking, the MAC checking process 216 notifies the counter setting process 220 of a failure of MAC checking. Upon notified of a failure of MAC checking via the MAC checking process 216, the counter setting process 220 discards the decrypted count value received from the decryption process 221. That is, upon notified of a failure of MAC checking via the MAC checking process 216, the counter setting process 220 receives the decrypted count value from the decryption process 221 but does not send the decrypted count value to the counter 215. Accordingly, the counter 215 should still hold the previously-held count value.

Using the count-value notification frame, it is possible to transfer the same count value from the first ECU 1 to the second ECU 2. Accordingly, the count value held by the first ECU 1 should be identical to the count value held by the second ECU 2.

When the second ECU 2 fails in MAC checking with respect to the count-value notification frame, the second ECU 2 may notifies the first ECU 1 of a failure of MAC checking. Upon notified of a failure of MAC checking with respect to the count-value notification frame via the second ECU 2, the first ECU 1 may retransmit the count-value notification frame to the second ECU 2. As the count-value notification frame subjected to retransmission, it is possible to use either the foregoing count-value notification frame used for notification of the same previous count value or another count-value notification frame used for notification of a new count value different from the previous count value.

[Configuration Example of Data Field of Data Frame Used to Transmit Transmission Data]

FIG. 5 shows a configuration example of a data field of a data frame used for transmitting transmission data. Herein, the data frame used for transmitting transmission data will be referred to as transmission-data transmitting frame. The transmission-data transmitting frame will be described with reference to FIG. 5.

The first ECU 1 transmits a transmission-data transmitting frame to the CAN 3. The first ECU 1 receives a transmission-data transmitting frame through the CAN 3. The second ECU 2 transmits a transmission-data transmitting frame to the CAN 3. The second ECU 2 receives a transmission-data transmitting frame through the CAN 3.

The data field of a transmission-data transmitting frame stores transmission data having maximally twenty-six bits, a bit string consisting of lower six bits of a count value, and a 32-bit MAC. The transmitter 111 of the first ECU 1 stores transmission data received from the switching unit 118, a bit string consisting of lower six bits of a count value held by the counter 115, and a MAC received from the MAC generator 114 in the data field of a transmission-data transmitting frame. The transmitter 211 of the second ECU 2 stores transmission data input thereto, a bit string consisting of lower six bits of a count value held by the counter 215, and a MAC received from the MAC generator 214 in the data field of a transmission-data transmitting frame.

In this connection, it is possible to use a predetermined portion of a bit string of a MAC generated by the MAC generator 114 or 214 as the MAC stored on the data field. For example, it is possible to store a 32-bit portion of a bit string of a 256-bit MAC generated by the MAC generator 114 or 214 on the data field.

(Method of Generating Transmission-Data Transmitting Frame)

The method of generating a transmission-data transmitting frame will be described below. The following description refers to an example of the second ECU 2 configured to generate a transmission-data transmitting frame; however, the same operation can be applied to the first ECU 1. The MAC generator 214 generates a concatenated data by concatenating the transmission data and the count value held by the counter 215, which are stored on the data field of a transmission-data transmitting frame. The MAC generator 214 generates a MAC for the concatenated data sing the session key stored on the session key storage 217. The MAC generator 214 generates and sends the MAC to the transmitter 211.

The transmitter 211 stores the transmission data input thereto, the bit string consisting of lower six bits of a count value held by the counter 215, and the MAC received from the MAC generator 214 on the data field of a transmission-data transmitting frame shown in FIG. 5. The predetermined frame format for a CAN data frame is applied to another portion of a transmission-data transmitting frame other than the data field. The transmitter 211 transmits the transmission-data transmitting frame to the CAN 3.

(Method of Reception Processing of Transmission-Data Transmitting Frame)

The method of reception processing of a transmission-data transmitting frame will be described below. The following description refers to an example of the second ECU 2 configured to receive a transmission-data transmitting frame; however, the same operation can be applied to the first ECU 1. The receiver 212 receives a transmission-data transmitting frame through the CAN 3. The transmission-data transmitting frame received by the receiver 212 will be referred to as a checking transmission-data transmitting frame subjected to checking.

The MAC checking process 216 checks a MAC stored on the data field of a checking transmission-data transmitting frame. The method of checking the MAC of a checking transmission-data transmitting frame will be described below. The MAC checking process 216 generates concatenated data by concatenating the transmission data stored on the data field of a checking transmission-data transmitting frame, a bit string consisting of upper twenty-six bits of a count value held by the counter 215, and a bit string consisting of lower six bits of a count value stored on the data field of a checking transmission-data transmitting frame. The MAC checking process 216 generates a MAC for the concatenated data using the session key stored on the session key storage 217. The MAC for the concatenated data will be referred to as a check-reference MAC. The MAC checking process 216 compares the check-reference MAC with the MAC stored on the data field of the checking transmission-data transmitting frame. Through the result of comparison, it is possible to successfully complete MAC checking when those MACs match each other, but MAC checking will fail when those MACs do not match each other.

When the data field stores a MAC representing a predetermined portion of a bit string of a MAC generated by the MAC generator 114 or 214, the MAC checking process 216 uses a predetermined portion of a bit string of a check-reference MAC for the purpose of MAC checking. When the data field stores a MAC representing a predetermined 32-bit portion of a bit string of a 256-bit MAC generated by the MAC generator 114 or 214, for example, the MAC checking process 216 uses a predetermined 32-bit portion of a bit string of a check-reference MAC for the purpose of MAC checking.

Due to a success of MAC checking, the MAC checking process 216 notifies the frame reception process 213 of a success of MAC checking. Upon notified of a success of MAC checking by the MAC checking process 216, the frame reception process 113 carries out a reception process, which is determined in advance for the sake of normally receiving transmission-data transmitting frames, with respect to a checking transmission-data transmitting frame.

Due to a failure of MAC checking, the MAC checking process 216 notifies the frame reception process 213 of a failure of MAC checking. Upon notified of a failure of MAC checking by the MAC checking process 216, the frame reception process 113 carries out an error process which is determined in advance.

Using the aforementioned transmission-data transmitting frames, it is possible to exchange transmission data between the first ECU 1 and the second ECU 2 or between the second ECUs 2.

Figure 6:
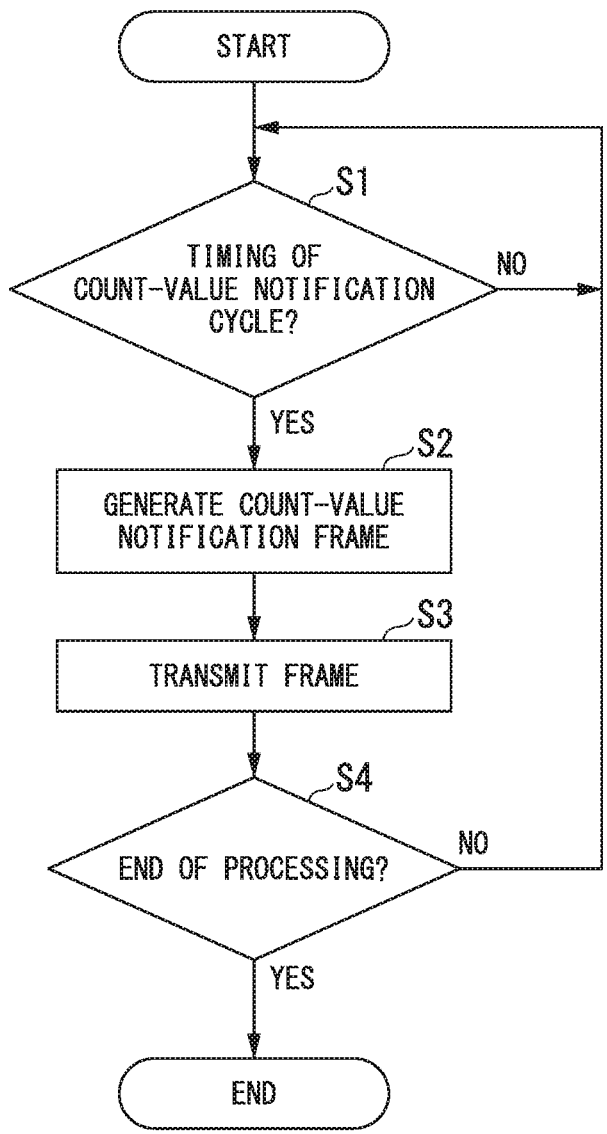
FIG. 6 is a flowchart showing an example of a count value sharing method according to one embodiment.
Figure 7:
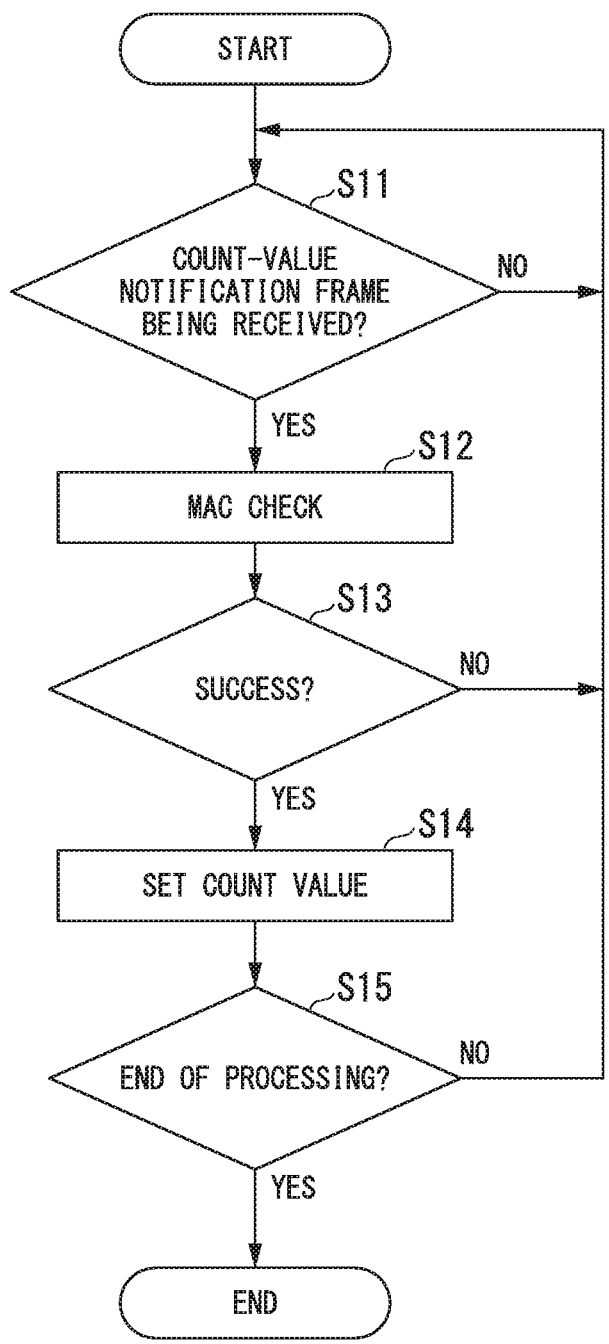
FIG. 7 is a flowchart showing an example of a count value sharing method according to one embodiment.

FIGS. 6 and 7 are flowcharts showing an example of a method of sharing count values according to the present embodiment. First, a procedure of the first ECU 1 implementing a count-value sharing process according to the present embodiment will be described with reference to FIG. 6.

(Step S1) The counter controller 119 of the first ECU 1 determines whether the current timing synchronizes with a cycle used for notification of a count value (hereinafter, referred to as a count-value notification cycle). The processing proceeds to step S2 when it is determined that the current timing synchronizes with a count-value notification cycle, otherwise, the processing repeats step S1 when the current timing does not synchronize with a count-value notification cycle. A predetermined time has been set to a count-value notification cycle in advance.

Alternatively, it is possible to set a time required for causing an overflow in lower six bits of a count value stored on the data field of a transmission-data transmitting frame to a count-value notification cycle. Accordingly, before the occurrence of an overflow in lower six bits of a count value stored on each of the first ECU 1 or the second ECU 2, it is possible for the first ECU 1 and the second ECU 2 to share the same count value using the count-value notification frame, and therefore, it is possible to match the count value held by the first ECU 1 with the count value held by the second ECU 2.

(Step S2) The first ECU 1 generates a count-value notification frame.

(Step S3) The first ECU 1 transmits the count-value notification frame to the CAN 3.

(Step S4) The first ECU 1 exits the aforementioned process due to the completion of the count-value sharing process of FIG. 6. On the other hand, the processing returns to step S1 to repeat the count-value sharing process of FIG. 6.

Next, a procedure of the second ECU 2 implementing the count-value sharing process according to the present embodiment will be described with reference to FIG. 7.

(Step S11) The receiver 212 of the second. ECU 2 determines whether it has received a count-value notification frame through the CAN 3. The processing proceeds to step S12 when it is determined that the receiver 212 has received the count-value notification frame, otherwise, the second ECU 2 repeats step S11 when the receiver 212 does not receive a count-value notification frame.

(Step S12) The MAC checking process 216 of the second ECU 2 carries out MAC checking for the count-value notification fame received by the receiver 212.

(Step S13) The processing proceeds to step S14 when the MAC checking process 216 successfully completes MAC checking. The processing returns to step S11 when the MAC checking fails.

(Step S14) The second ECU 2 sets a decrypted count value, representing the result of decrypting an encrypted count value stored on the data field of the count-value notification frame received by the receiver 212, to the counter 215 as a new count value.

(Step S15) The second ECU 2 exits the aforementioned processing clue to the completion of the count-value sharing process of FIG. 7. On the other hand, the processing returns to step S11 to repeat the count-value sharing process of FIG. 7.

[Configuration Example of Automobile]

Figure 8:
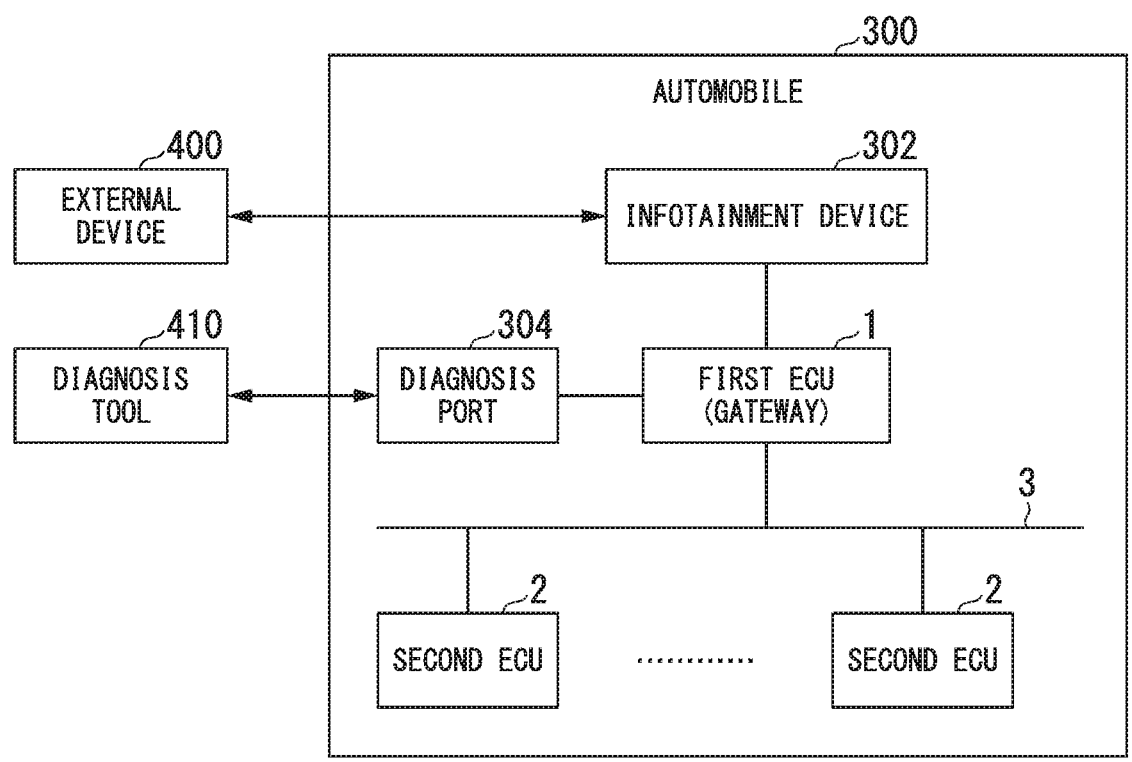
FIG. 8 is a block diagram showing a configuration example of an automobile according to one embodiment.

FIG. 8 is a block diagram showing a configuration example of an automobile 300 according to the present embodiment. In FIG. 8, the automobile 300 includes the first ECU 1, a plurality of second ECUs 2, the CAN 3, a diagnosis port 304, and an infotainment device 302. The first ECU 1 and the second ECUs 2 are connected to the CAN 3. The first ECU 1 and the second ECUs 2 are board computers mounted on the automobile 300. The first ECU 1 is an ECU having a gateway function among ECUs mounted on the automobile 300. The second ECUs 2 are ECUs having an engine control function or the like among ECUs mounted on the automobile 300. As the second ECUs 2, for example, it is possible to mention an ECU having an engine control function, an ECU having a handle control function, and an ECU having a brake control function.

The first ECU 1 exchange data with the second ECUs 2 through the CAN 3. The second ECU 2 exchanges data with another second ECU 2 through the CAN 3.

As the infotainment device 302, for example, it is possible to mention a navigation function, a position-information service function, a multimedia function such as music and moving images, a voice communication function, a data communication function, an Internet-connecting function, and the like. The infotainment device 302 is connected to an external device 400, and therefore, the infotainment device 302 is able to exchange data with the external device 400. As the external device 400, for example, it is possible to mention a mobile communication terminal and an audio-visual device. The infotainment device 302 is connected to the first ECU 1.

The diagnosis port 304 is connectible to a diagnosis tool 410. The diagnosis tool 410 is configured to change settings of data, and to install update programs in the first ECU 1 and/or the second ECUs 2. As the diagnosis port 304, for example, it is possible to use an OBD (Onboard Diagnostics) port.

The infotainment device 302 may transmit or receive data with the second ECUs 2 connected to the CAN 3 by means of the first ECU 1. The first ECU 1 monitors data being transferred between the infotainment device 302 and the second ECUs 2.

The diagnosis tool 410 receives or transmits data with the second ECUs 2 connected to the CAN 3 by means of the diagnosis port 304 and the first ECU 1. The first ECU 1 monitors data being transferred between the diagnosis tool 410 and the second ECUs 2.

As a communication network installed in a vehicle, it is possible to provide the automobile 300 with another communication network other than the CAN, and therefore, it is possible to exchange data between the first ECU 1 and the second ECUs 2 and to exchange data between the second ECUs 2 through another communication network other than the CAN. For example, it is possible to provide the automobile 300 with a LIN (Local Interconnect Network). Alternatively, it is possible to provide the automobile 300 with both the CAN and the LIN. In addition, it is possible to provide the automobile 300 with a second ECU 2 connectible to the LIN. Moreover, it is possible to connect the first ECU 1 through both the CAN and the LIN. That is, the first ECU 1 may exchange data with the second ECU 2 connected to the CAN through the CAN, while the first ECU 1 may exchange data with the second ECU 2 connected to the LIN through the LIN. In addition, it is possible for the second ECUs 2 to exchange data through the LIN.

The present embodiment realizes the function of sharing a count value, which is used for generating and checking a MAC, between the first ECU 1 and the second ECU 2, by way of periodical notification of the same count value using a count-value notification frame from the first ECU 1 to the second ECUs 2. This may eliminates the necessity of making an inquiry for count values between the first ECU 1 and the second ECUs 2, thus yielding an effect of improving efficiency in MAC checking.

When the data length of a count value is too long to be incorporated into a single count-value notification frame, the first ECU 1 divides a bit string of a count value into multiple subdivisions, which are then dispersedly stored on multiple count-value notification frames. The second ECU 2 restores a bit string of a single count value out of multiple count-value notification frames for dispersedly storing subdivisions of a bit string of a single count value. In this case, a MAC is generated using an original count value before division and stored on the data field in each of multiple count-value notification frames.

In the present embodiment, the first ECU 1 may serve as a transmission node, a reception node, or a count-value notification node. The second ECU 2 may server as a transmission node or a reception node. The count-value notification frame corresponds to a count-value notification message. In addition, a transmission-data transmitting frame corresponds to a message.

In this connection, the present embodiment may provide a single independent node as a count-value notification node. According to the configuration example of the automobile 300 shown in FIG. 8, the first ECU 1 having a gateway function may share the function of a count-value notification node. Alternatively, it is possible to provide a single second ECU 2 having the function of a count-value notification node instead of the first ECU 1 having a gateway function.

The foregoing embodiment of the present invention has been has been described in detail with reference to the drawings. However, concrete configurations are not necessarily limited to the foregoing embodiment; hence, the present invention may embrace any changes of design without departing from the subject matter of the invention.

The foregoing embodiment refers to an automobile as an example of a vehicle, however, the present invention is applicable to other types of vehicles other than automobiles such as a motorcycle and a railway vehicle.

It is possible to store computer programs causing the first ECU 1 and the second ECUs 2 to implement the foregoing functions on computer-readable storage media; and then, computer programs stored on storage media can be loaded into computer systems, thus achieving the foregoing functions. Herein, the term "computer system" may embrace an OS and hardware such as peripheral devices.

The term "computer-readable storage media" may refer to flexible disks, magneto-optic disks, ROM, rewritable non-volatile memory such as flash memory, portable media such as DVD (Digital Versatile Disk), and storage devices such as hard disks embedded in computer systems.

In addition, the term "computer-readable storage media" may embrace any measures configured to hold programs for a while such as volatile memory (e.g. DRAM (Dynamic Random Access Memory)) embedded in computer systems which may operate as a server or a client upon receiving programs transmitted through networks such as the Internet, communication lines, and telephone lines.

The foregoing programs may be transferred from one computer system having a storage device configured to store programs to another computer system through transmission media or via transmission waves propagating through transmission media. Herein, the term "transmission media" used to transmit programs may refer to any media having functions to transmit information such as networks (or communication lines) such as the Internet, and communication lines such as telephone lines.

The foregoing programs may achieve part of the foregoing functions.

The foregoing programs may be differential files (or differential programs) able to achieve the foregoing functions when combined with pre-installed programs of computer systems.

REFERENCE SIGNS LIST 1 first ECU
2 second ECU
3 CAN
10 communication network system
111, 211 transmitter
112, 212 receiver
113, 213 frame reception process
114, 214 MAC generator
115, 215 counter
116, 216 MAC checking process
117, 217 session key storage
118 switching unit
119 counter controller
120 count-value generator
121 encryption process
220 counter setting process
221 decryption process
300 automobile
302 infotainment device
304 diagnosis port

The invention claimed is:

1. A communication network system, comprising:
a plurality of control units, sharing a session key, that are collectively installed in a physical entity to exchange data therebetween through a network so as to achieve functions allocated thereto,
wherein a first control unit serving as a transmission node is configured to send a count-value notification message to a second control unit serving as a reception node, through the network,
wherein the first control unit comprises a first hardware processor configured to execute instructions stored on its memory and to implement
generating a count value,
encrypting the count value using the session key,
generating a first message authentication code using the count value and the session key, and
transmitting, in a count-value notification cycle, the count-value notification message including the encrypted count value and the first message authentication code, and
wherein the second control unit comprises a second hardware processor configured to execute instructions stored on its memory and to implement receiving the count-value notification message from the first control unit,
  decrypting the encrypted count value to reproduce the count value,
  generating a second message authentication code using the reproduced count value and the session key, and
  checking whether the first message authentication code matches the second message authentication code, thus determining
    (i) when matched, the second control unit updates its count value stored therein with the reproduced count value, and
    (ii) when unmatched, the second control unit discards the reproduced count value, and
wherein the first control unit is configured to transmit a transmission-data transmitting frame to the second control unit via (a) through (e),
  (a) generating by the first control unit the transmission-data transmitting frame including transmission data, a lower-bit string of the count value, and a third message authentication code, wherein the third message authentication code is generated from the transmission data and the count value using the session key,
  (b) reproducing by the second control unit the count value by concatenating an upper-bit string of the count value stored therein and the lower-bit string of the count value included in the transmission-data transmitting frame,
  (c) generating by the second control unit a fourth message authentication code from the transmission data included in the transmission-data transmitting frame and the reproduced count value using the session key,
  (d) checking whether the third message authentication code matches the fourth message authentication code, and
  (e) when matched, accepting the transmission data with the second control unit.

2. The communication network system according to claim 1, wherein the plurality of control units are collectively installed in a vehicle as the physical entity such that the plurality of control units are connected together through a control area network (CAN).

3. A count-value notification node selected from among a plurality of control units, sharing a session key, that are collectively installed in a physical entity to exchange data therebetween through a network so as to achieve functions allocated thereto,
wherein the count-value notification node comprises a hardware processor configured to execute instructions stored on its memory and to implement
  generating a count value,
  encrypting the count value stored using the session key,
  generating a message authentication code using the count value and the session key, and
  transmitting, in a count-value notification cycle, a count-value notification message, including the encrypted count value and the message authentication code,
wherein a counterpart node selected from among the plurality of control units, comprises a hardware processor, is configured to receive the count-value notification message upon checking validity of the message authentication code, thus accepting the count value decrypted from the encrypted count value, and wherein the count-value notification node is configured to transmit a transmission-data transmitting frame to the selected counterpart node via (a) through (e),
  (a) generating by the count-value notification node the transmission-data transmitting frame including transmission data, a lower-bit string of the count value, and a third message authentication code, wherein the third message authentication code is generated from the transmission data and the count value using the session key,
  (b) reproducing by the selected counterpart node the count value by concatenating an upper-bit string of the count value stored therein and the lower-bit string of the count value included in the transmission-data transmitting frame,
  (c) generating by the selected counterpart node a fourth message authentication code from the transmission data included in the transmission-data transmitting frame and the reproduced count value using the session key,
  (d) checking whether the third message authentication code matches the fourth message authentication code, and
  (e) when matched, accepting the transmission data with the second control unit.

4. The count-value notification node according to claim 3, wherein the plurality of control units are collectively installed in a vehicle as the physical entity, such that the plurality of control units are connected together through a control area network (CAN).

5. A count-value sharing method adapted to a transmission node and a reception node selected from among a plurality of control units, sharing a session key, that are collectively installed in a physical entity to exchange data therebetween through a network so as to achieve functions allocated thereto, the method comprising:
  generating a count value,
  encrypting, using a hardware processor of the transmission node, the count value using the session key,
  generating a first message authentication code using the first count value and the session key,
  transmitting, in a count-value notification cycle, the count-value notification message including the encrypted count value and the first message authentication code from the transmission node to the reception node,
  decrypting, using a hardware processor of the reception node, the encrypted count value included in the count-value notification message to reproduce the count value,
  generating a second message authentication code using the reproduced count value and the session key, and
  checking whether the first message authentication code matches the second message authentication code, thus determining
    (i) when matched, the reception node updates its count value stored therein with the reproduced count value, and
    (ii) when unmatched, the reception node discards the reproduced count value, and
wherein the transmission node is configured to transmit a transmission-data transmitting frame to the reception node via (a) through (e),
  (a) generating by the transmission node the transmission-data transmitting frame including transmission data, a lower-bit string of the count value, and a third message authentication code, wherein the third message authentication code is generated from the transmission data and the count value using the session key, (b) reproducing by the reception node the count value by concatenating an upper-bit string of the count value stored therein and the lower-bit string of the count value included in the transmission-data transmitting frame, (c) generating by the reception node a fourth message authentication code from the transmission data included in the transmission-data transmitting frame and the reproduced count value using the session key, (d) checking whether the third message authentication code matches the fourth message authentication code, and (e) when matched, accepting the transmission data with the second control unit.

6. The count-value sharing method according to claim 5, wherein the plurality of control units are collectively installed in a vehicle as the physical entity, such that the plurality of control units are connected together through a control area network (CAN).

7. A non-transitory computer-readable storage medium having a stored computer program causing a computer of a count-value notification node to implement the count-value sharing method according to claim 5.

* * * * *